United States Patent
Sen et al.

(10) Patent No.: US 6,556,556 B1
(45) Date of Patent: Apr. 29, 2003

(54) METHOD AND SYSTEM FOR LIMITING DATA PACKET TRANSMISSION WITHIN A DIGITAL MOBILE TELEPHONE COMMUNICATION NETWORK BY DISCARDING UNSUCCESSFULLY TRANSMITTED RADIO LINK PROTOCOL FRAMES

(75) Inventors: Sanjoy Kumar Sen, Plano, TX (US); Arun Arunachalam, Plano, TX (US); Kalyan Basu, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/239,285

(22) Filed: Jan. 29, 1999

(51) Int. Cl.[7] .................................................. H04Q 7/34
(52) U.S. Cl. ....................................... 370/342; 370/474
(58) Field of Search ................................ 370/336, 345, 370/349, 473, 474, 342

(56) References Cited

U.S. PATENT DOCUMENTS

| | | | |
|---|---|---|---|
| 5,610,595 A | | 3/1997 | Garrabrant et al. |
| 6,052,819 A | * | 4/2000 | Barker et al. ................ 370/469 |
| 6,208,620 B1 | * | 3/2001 | Sen et al. .................... 370/231 |

FOREIGN PATENT DOCUMENTS

| EP | 0 969 623 A2 | 1/2000 |
|---|---|---|

OTHER PUBLICATIONS

"Series H: Transmission of Non–Telephone Signals," ITU–T Telecommunication Standardization Sector of ITU, 1996, pp. A–B, I–II, 1–22, XP000667441.

De Lima, Heliomar M., Duarte, Otto Carlos M. B., "A Go–Back–N Protocol with Multicopy Retransmission for High Speed Satellite Communications," International Conference on Communications (ICC), US, New York, IEEE, May 1, 1994, pp. 859–863, XP000438629.

* cited by examiner

*Primary Examiner*—Melvin Marcelo
(74) *Attorney, Agent, or Firm*—John D. Crane; Bracewell & Patterson, L.L.P.

(57) ABSTRACT

An improved method and system for limiting data packet transmission within a digital mobile telephone communication network, such as a code division multiple access (CDMA) mobile telephone communication network, by discarding unsuccessfully transmitted radio link protocol frames is disclosed. A code division multiple access (CDMA) mobile telephone communication network includes a mobile telephone, a base station, a mobile switching center, and a network Interworking Function. Within the CDMA mobile telephone communication network, each point-to-point protocol data packet is typically divided into multiple radio link protocol frames before their transmissions over an air link. In accordance with a method and system of the present invention, a marker bit is provided for each of the radio link protocol frames. The marker bit can be part of the frame header and will be removed before air link transmission. The marker bit of a first one of the radio link protocol frames is set to a first logical state (such as a logical "1") and the rest of the radio link protocol frames are set to a second logical state (such as a logical "0"). In response to an unsuccessful transmission of one of the radio link protocol frames, all of the radio link protocol frames within the same point-to-point protocol data packet having the marker bit set to the second logical state are discarded, after a predetermined number of unsuccessful re-transmission attempts.

14 Claims, 4 Drawing Sheets

METHOD AND SYSTEM FOR LIMITING DATA PACKET TRANSMISSION WITHIN A DIGITAL MOBILE TELEPHONE COMMUNICATION NETWORK BY DISCARDING UNSUCCESSFULLY TRANSMITTED RADIO LINK PROTOCOL FRAMES

BACKGROUND OF THE INVENTION

1. Technical Field

The present invention relates to a method and system for servicing a wireless communication network in general, and in particular to a method and system for servicing a mobile telephone communication network. Still more particularly, the present invention relates to a method and system for discarding radio link protocol frames within a code division multiple access (CDMA) mobile telephone communication network.

2. Description of the Prior Art

A CDMA mobile telephone communication network is an integrated network comprising a land-based wireline telephone network and a composite wired-wireless network. The land-based wireline network is the traditional telephone system in which each telephone subscriber is connected to a central switching network commonly known as the public switched telephone network (PSTN). The composite wire-wireless network is the basis of today's mobile telephone communication network.

Within a CDMA mobile telephone communication network, data transmission between a mobile station and a base station controller is accomplished via an air link (or a radio link). Before data transmission, each data packet from an application is typically divided into multiple smaller frames. If a frame happens to be lost during the transmission, an Automatic Repeat Request (ARQ) service is commonly available for recovering the lost frame from the air link. An example of such ARQ service is the radio link protocol (RLP) as detailed in IS-99. The ARQ service generally performs a limited number of re-transmissions to attempt to send the lost frame to its destination. If the lost frame cannot be transmitted after the completion of a limited number of retransmission trials, the data packet (to which the lost frame belongs) becomes corrupted, and the entire data packet will have to be re-transmitted. The present invention provides an improved method and system for handling lost frames during an unsuccessful data transmission within a CDMA mobile telephone communication network.

SUMMARY OF THE INVENTION

A code division multiple access (CDMA) mobile telephone communication network includes a mobile telephone, a base station, a mobile switching center, and a network Interworking Function. Within the CDMA mobile telephone communication network, each point-to-point protocol data packet is typically divided into multiple radio link protocol frames before their transmissions over an air link. In accordance with a method and system of the present invention, a marker bit is provided for each of the radio link protocol frames. The marker bit can be part of the frame header and will be removed before air link transmission. The marker bit of a first one of the radio link protocol frames is set to a first logical state (such as a logical "1") and the rest of the radio link protocol frames are set to a second logical state (such as a logical "0"). In response to an unsuccessful transmission of one of the radio link protocol frames, all of the radio link protocol frames within the same point-to-point protocol data packet having the marker bit set to the second logical state are discarded, after a predetermined number of unsuccessful re-transmission attempts.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawing, wherein.

DETAILED DESCRIPTION OF A PREFERRED EMBODIMENT

Figure 1:
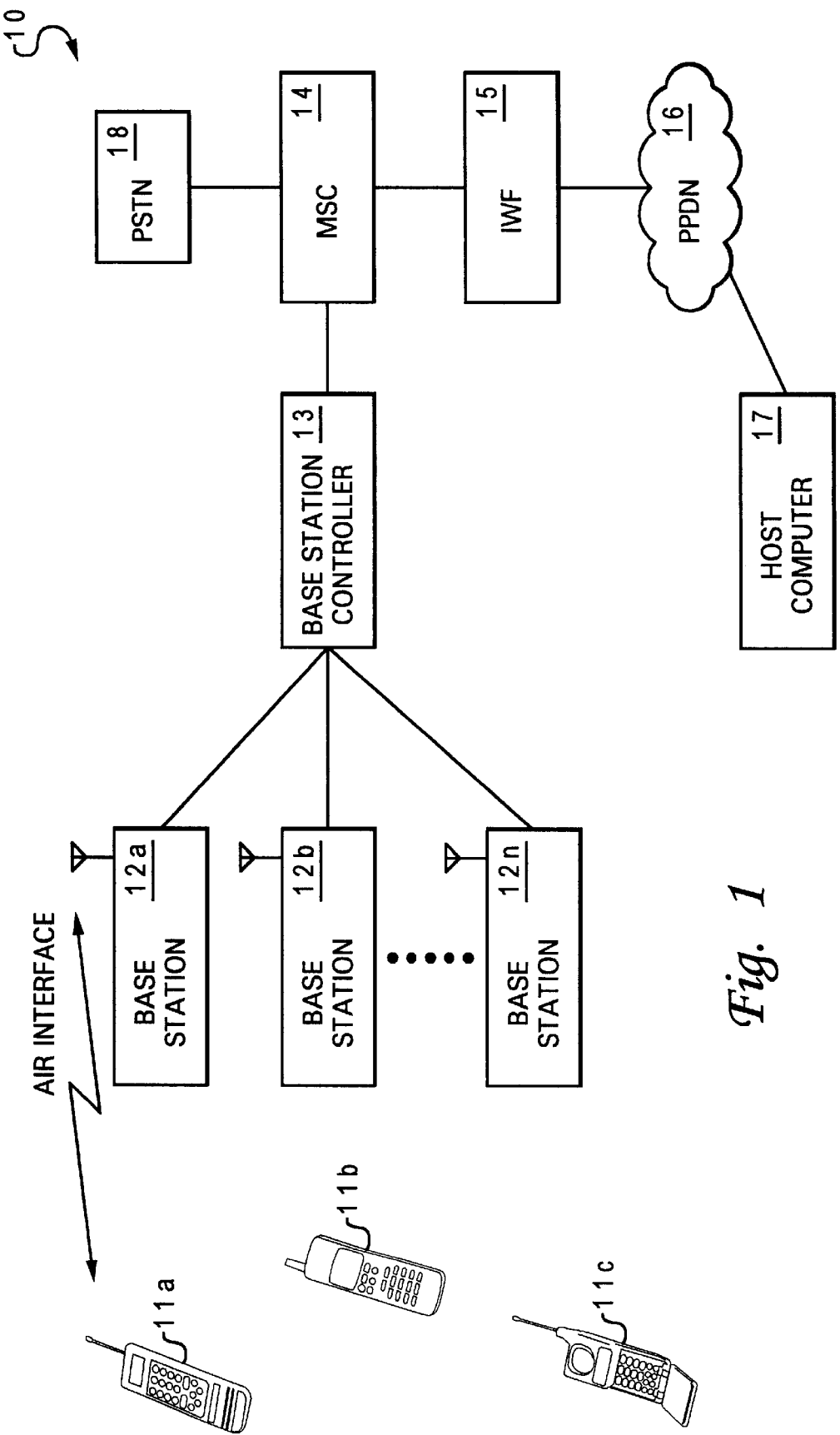
FIG. 1 is a pictorial diagram of a mobile telephone communication network in which a preferred embodiment of the present invention may be implemented.

The present invention is applicable in all digital protocol-based mobile telephone communications systems having a non-transparent data link. Referring now to the drawings and in particular to FIG. 1, there is depicted a pictorial diagram of a mobile telephone communication network 10 in which a preferred embodiment of the present invention may be implemented. Communication network 10 utilizes a digital protocol such as code division multiple access (CDMA). As shown, communication network 10 includes several base stations 12a–12n located at various locations within communication network 10. Each of base stations 12a–12n is controlled by a base station controller (BSC) 13.

Coupled to BSC 13 is a mobile switching center (MSC) 14 for supporting CDMA and connectivity to a public switched telephone network (PSTN) 18. In addition, MSC 14 also supports various call processing functions. MSC 14 is coupled to a network Interworking Function (IWF) 15 via an L-Interface. IWF 15 is coupled to a host computer system 17 via a public packet data network (PPDN) 16. Host computer system 17 may be, for example, a midrange computer having a processor (not shown), a main memory (not shown), and a storage device (not shown) as is well-known to those skilled in the art. Host computer system 17 communicates with PPDN 16 utilizing a standard procedure that is also well-known to those skilled in the art.

Within the service area of communication network 10, there are several mobile telephones, such as mobiles 11a, 11b, and 11c. The software for handling the exchange of data packets between one of mobiles 11a–11c and one of base stations 12a–12n within communication network 10 commonly resides within mobiles 11a–11c and BSC 13.

Figure 2:
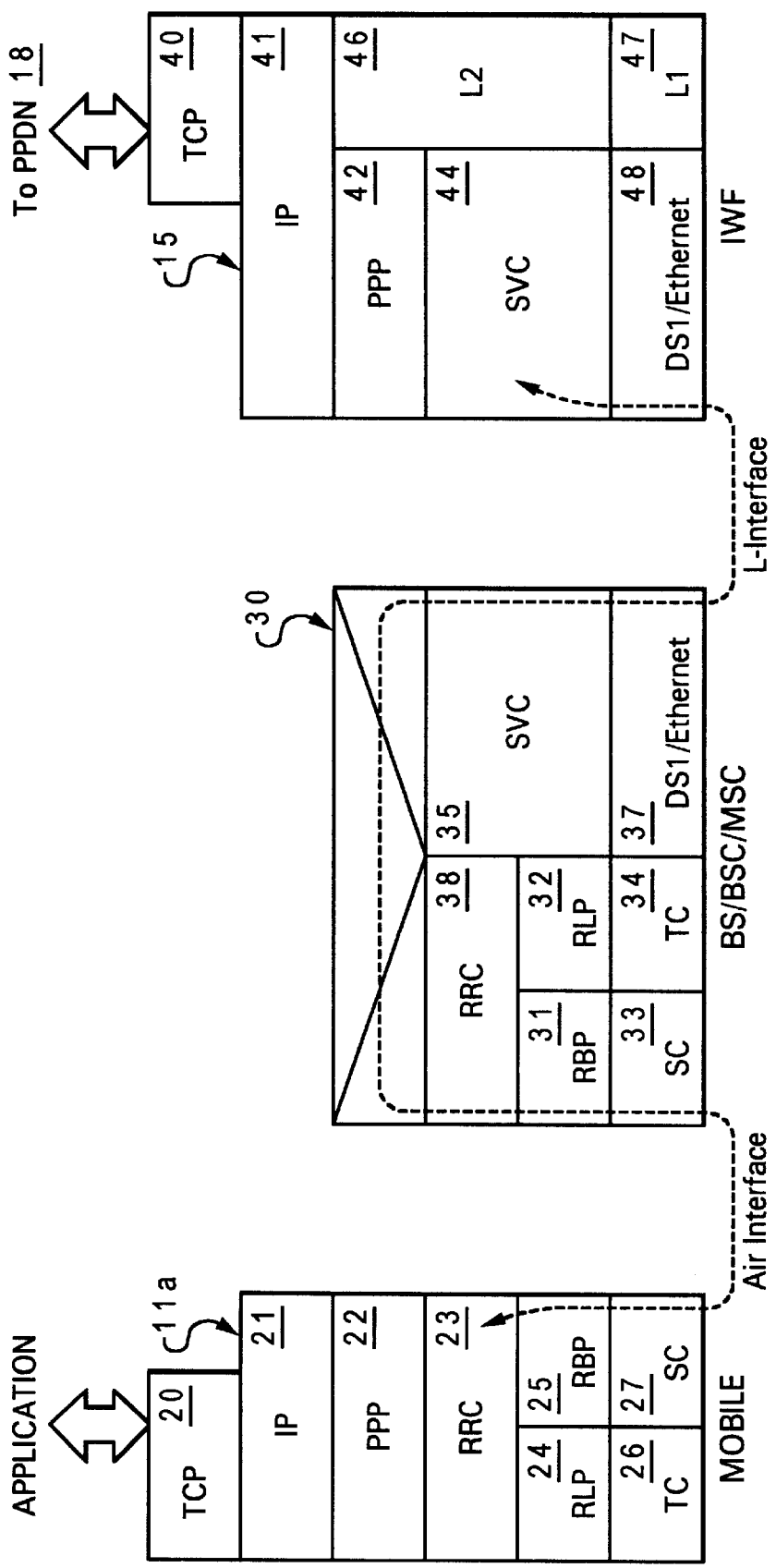
FIG. 2 is a block diagram of the pertinent components from FIG. 1 for handling the exchange of data packets between a mobile telephone and a base station, in accordance with a preferred embodiment of the present invention.

With reference now to FIG. 2, there is depicted a block diagram of the protocol stacks of the pertinent components from FIG. 1 that handle the exchange of data packets, in accordance with a preferred embodiment of the present invention. As shown, the pertinent components include mobile 11*a*, a BS/BSC/MSC 30 (which is base station 12*a*, BSC 13, and MSC 14 from FIG. 1 combined into a single entity for ease of illustration), and IWF 15. The software configuration of mobile 11*a* comprises several layers, including an Transmission Control Protocol (TCP) layer 20, Internet Protocol (IP) layer 21, a Point-to-Point Protocol (PPP) layer 22, a Radio Link Protocol (RLP) layer 24, a Radio Burst Protocol (RBP) layer 25, a RLP-RBP controller (RRC) layer 23, a group of traffic channels 26, and a group of shared channels 27. Details regarding TCP layer 20, IP layer 21, PPP layer 22, and RLP layer 24 can be found in IS-707, which is incorporated herein by reference. The software configuration of BS/BSC/MSC 30 comprises a RRC layer 38, a RBP layer 31, a RLP layer 32, a group of shared channels 33, a group of traffic channels 34, a Switched Virtual Connection (SVC) 35, and a DS1/Ethernet layer 37. The software configuration of IWF 15 comprises an TCP layer 40, IP layer 41, a PPP layer 42, a SVC layer 44, an L2 layer 46, an L1 layer 47, and a DS1/Ethernet layer 48. The dashed line in FIG. 2 indicates the data path for data packet transmissions.

An application sends data packets to and receives data packets from mobile 11*a*. After receiving a data packet from an application, TCP layer 20 and IP layer 21 within mobile 11*a* then send the data packet down to RRC layer 23 through PPP layer 22. The main function of RRC layer 23 is to act as a layer for multiplexing/demultiplexing data packet traffic between the upper layers (i.e., PPP layer 22 and above) and the resources of RLP 24 and RBP 25. Traffic channels 26 (such as IS-95 traffic channels and common traffic channels) are dedicated to one mobile station while shared channels 27 (such as IS-95 Access/Paging channels) are utilized by more than one mobile station. When traffic channels 26 are selected, RLP layer 24 is utilized as the Automatic Repeat Request (ARQ) protocol over the air as described in IS-707. When shared channels 27 are selected, RBP layer 25 is utilized as the ARQ protocol over the air. In order to determine over which RF channels to direct user data, RRC layer 23 utilizes factors such as amount of user data, whether RLP layer 24 is currently active, readiness of traffic channels 26, and attributes of the current data service. Layers above RRC layer 23 in mobile 11*a* (i.e., TCP layer 20, IP layer 21, and PPP layer 22) are unaware of whether traffic channels 26 or shared channels 27 is being utilized.

During a regular packet data session of a Packet Data Service, mobile 11*a* typically exchanges data utilizing traffic channels 26, and RRC layer 23 automatically directs all mobile user data packets to traffic channels 26. When there are no more data packet to be exchanged, mobile 11*a* goes into a dormant mode. In the dormant mode, all channels within traffic channels 26 and shared channels 27 are released, and there is no communication even though the packet data session is still logically connected. At some later time, when a data packet needs to be sent, an application then sends the data packet from some upper layer down to RRC layer 23 via TCP layer 20, IP layer 21 and PPP layer 22. RRC layer 23 then directs the data packet to RBP layer 25 (instead of initiating RLP layer 24 and traffic channels 26). The data packet is subsequently transmitted over one of shared channels 27 utilizing RBP layer 25 in accordance with a Radio Burst Protocol via an air interface, as part of a packet data session according to the IS-95 and IS-707 specification, the pertinent part of which is incorporated herein by reference.

The data packet is received from shared channels 33 in BS/BSC/MSC 30 by RBP layer 31. RRC layer 38 then directs the user data to SVC 35 in BS/BSC/MSC 30. Subsequently, the data packet is delivered to IWF 15. The delivery may be performed in the same way as it is normally performed in the Packet Data Service when traffic channels are utilized. After the user data has been delivered across the L-interface to IWF 15, the data packet is sent to PPP layer 42 via DS1/Ethernet 48 and SVC 44. Communication between BS/BSC/MSC 30 and IWF 15 is maintained via an L-interface in accordance with the IS-658 specification, the pertinent part of which is incorporated herein by reference. IWF 15 communicates with PPDN 18 in a manner that is well-known in the art.

IWF 15 maintains a link layer connection for each mobile that has 11 the Packet Data Service activated. When there is no data to be transmitted, the link layer connection in IWF 15 is made dormant. Generally speaking, whether or not the link layer connection in IWF 15 will proceed to an active (or dormant) state depends on the creation (or destruction) of a frame relay SVC across the Mobile Data Path between BS/BSC/MSC 20 and IWF 15. During the dormant state, no SVC will be maintained.

The Radio Burst Protocol is a lightweight ARQ protocol that improves reliability of message delivery over shared channels 27. Although the Radio Burst Protocol does not require a lengthy information exchange between mobile 1 la and BS/BSC/MSC 30 for initialization, BS/BSC/MSC 30 is required to return an acknowledgment over one of shared channels 27 to mobile 11*a* indicating that the data packet was received properly. For example, the sender transmits a data packet over shared channels 27 in its entirety, and the receiver sends a positive acknowledgement to the sender upon the receipt of the data packet. If no such acknowledgement is received, the sender then re-transmits the entire data packet. If no acknowledgement is received after re-transmission of the data packet, the re-transmission process is performed several more times, after which the data packet will be discarded and the transmission will be deemed as a failure. Data packets transmitted in one direction are independent of data packets sent in the other direction. As such, there can only be one outstanding data packet in one direction at any time. BS/BSC/MSC 30 can initiate the packet data session in a similar manner as mobile 11*a*.

Figure 3:
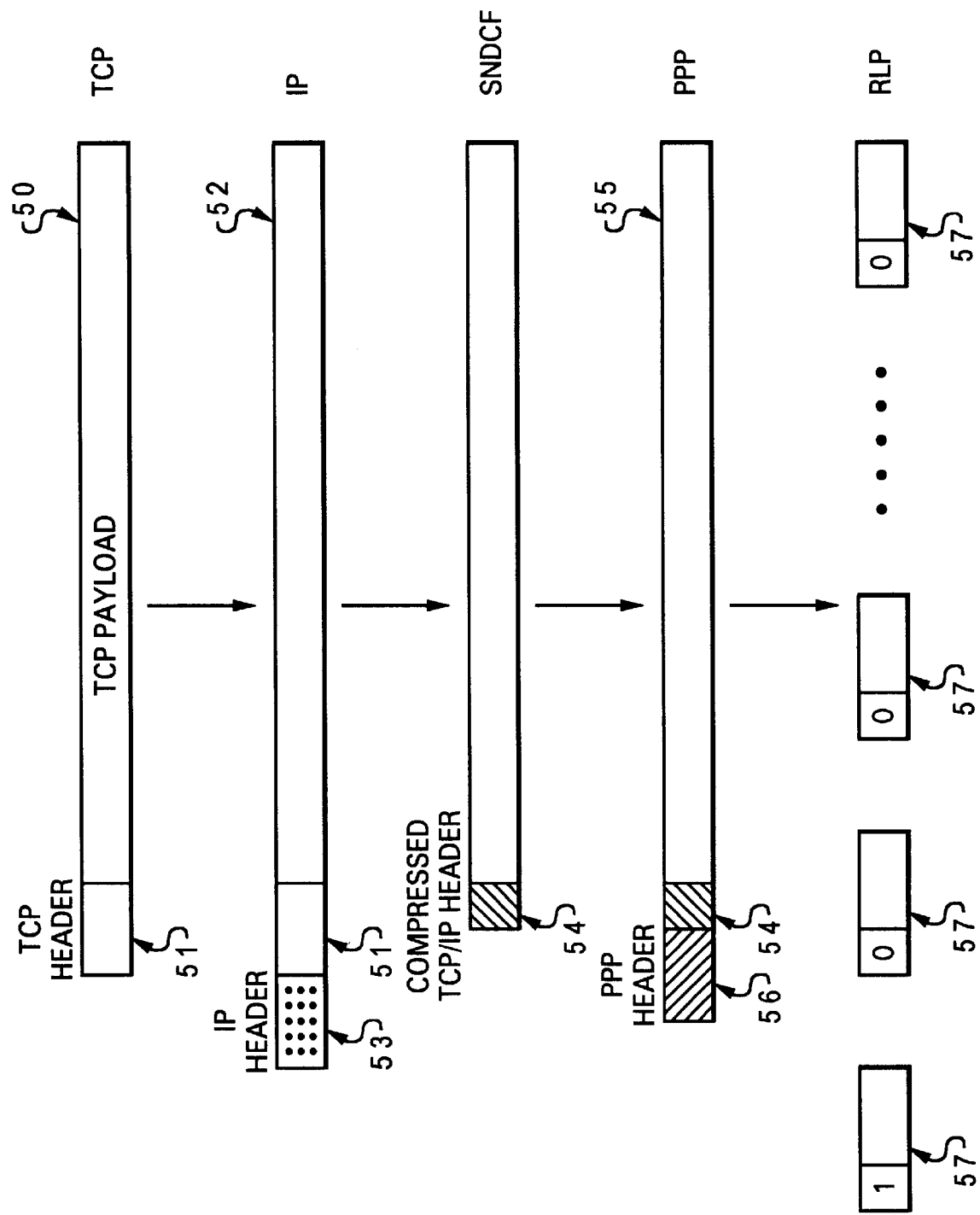
FIG. 3 is a pictorial illustration of the format of a data packet at each protocol level, in according to a preferred embodiment of the present invention.

Referring now to FIG. 3, there is a pictorial illustration of the format of a data packet at each protocol level, according to a preferred embodiment of the present invention. As shown, at the TCP level, a data packet 50, typically 2 Kbytes long, includes a TCP header 51 and a TCP payload. At the IP level, an IP header 53 is added to a TCP header 51 to form an IP packet 52. Both TCP header 51 and IP header 53 can be compressed to form a compressed TCP/IP header 54 at a sub-network dependent convengence function (SNDCF) layer, if necessary. At the PPP layer, a PPP header 56 is added to compressed TCP/IP header 54 to form a PPP packet 55. At the RLP layer, PPP packet 55 is divided into multiple RLP frames 57, each approximately 20 bytes long.

After PPP packet 55 has been divided into multiple RLP frames 57, header bits (such as a sequence number of a next frame to be sent, a control number, and a frame length) are attached to each RLP frame 57. All RLP frames 57 are then sequentially loaded into a transmit buffer within the RLP layer. In addition, an RLP sender within the RLP layer maintains an 8-bit sequence number counter for all the successfully transmitted frames. But whenever a frame is not received successfully, the receiver sends a negative acknowledge character (NAK) control frame requesting the RLP sender for a re-transmission. The RLP sender then tries to re-transmit the lost (or corrupted) frame for at most six times. Preferably, the RLP sender re-transmits all unsuccessfully transmitted frames within a PPP data packet using a minimum of three and a maximum of six re-transmissions for each frame. If the RLP sender fails to transmit a frame successfully after six re-transmission attempts, under the prior art implementation, the RLP sender will continue to transmit all frames subsequent to the lost frame because the RLP sender is oblivious of the higher level packet structure. However, the effort of transmitting any frame subsequent to the lost frame is deemed unnecessary because a reliable transport protocol will retransmit the entire data packet again. For example, if a PPP data packet contains frames 1, 2, . . . , N in which frame m (where $1 \leq m \leq N$) could not be successfully transmitted after a predetermined number (from three to six) of retransmission attempts at the RLP layer, the frames after m (i.e., m+1, m+2, . . . , N) that are part of the same PPP data packet should not be transmitted. This is because transmission (with possible re-transmission attempts) of these RLP frames will be duplicated in the future (when TCP re-transmits the data packet) and leads to unnecessary air link interference to other users, which will ultimately increase buffer requirements and will decrease TCP throughput due to longer delay. The present invention provides a mechanism to prevent the unnecessary data frame transmissions from happening.

In accordance with a preferred embodiment of the present invention, when a PPP data packet is split into several RLP frames, a marker bit is added in the header of all the RLP frames. In addition, the marker bit of a starting frame is set to "1" while all the other frames subsequent to the starting frame within the same PPP data packet are set to "0." This marker bit is used by the transmit buffer management algorithm in the RLP layer to identify those RLP frames that can be discarded from the transmit buffer. Thus, during the division of PPP data packets into various RLP frames, the RLP sender needs to keep track of the starting frame for each PPP data packet. The starting frame of a PPP packet can be determined by examining the PPP flag sequence. The marker bit is utilized only by the RLP sender. Before the transmission of a frame to the IS-95 physical layer, the marker bit has to be removed, even for the starting frame.

When the RLP sender detects that a frame could not be transmitted successfully after all the required re-transmission attempts, the RLP reader not only discards that frame, but also all subsequent frames in the transmit buffer having the marker bit set to "0," until a frame having the marker bit set to "1" is reached, which is the starting frame of a next PPP data packet. Data transmission can resume with the starting frame of the next PPP data packet.

Figure 4:
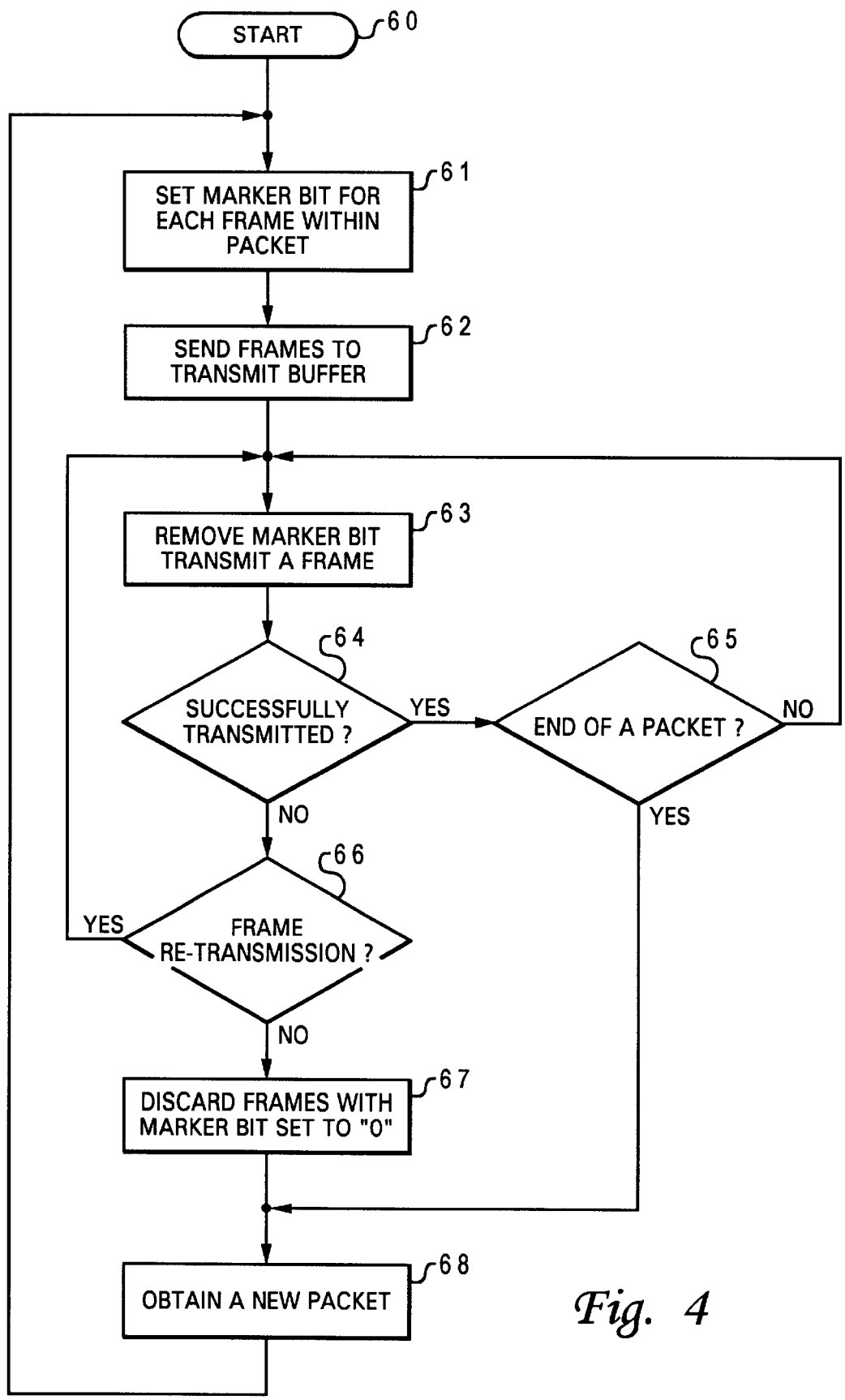
FIG. 4 is a high-level flow diagram of a method for discarding radio link protocol frames within a CDMA mobile telephone communication network, in accordance with a preferred embodiment of the present invention.

With reference now to FIG. 4, there is illustrated a high-level flow diagram of a method for discarding radio link protocol frames within a CDMA mobile telephone communication network, in accordance with a preferred embodiment of the present invention. Starting at block 60, the marker bit for each frame within a PPP data packet is accordingly set, as mentioned previously, as shown in block 61. The frames are then sent to a transmit buffer, as shown in block 62. After removing the marker bit on a frame, the RLP sender then transmits the frame to a receiver, as depicted in block 63. Next, a determination is made as to whether or not the data transmission is successfully completed, as illustrated in block 64. If the data transmission is successfully completed, another determination is made as to whether or not the end of the PPP data packet has been reached, as illustrated in block 65. If the end of the PPP data packet has not been reached, the process returns to block 63 for a next frame; otherwise, the process proceeds to block 68 for a new PPP data packet.

However, if the data transmission is not successfully completed, all subsequent frames having their marker bit set to "0" (i.e., remaining frames within the PPP data packet) within the transmit buffer are discarded, as shown in block 67. The RLP sender attempts to re-transmit a frame for at least three times before considering the transmission is unsuccessful. The transmission resumes with a frame having its marker bit set to "1" (i.e., a starting frame of a new PPP data packet), as depicted in block 68. The RLP sender identifies and deletes from the transmit buffer all frames between the "lost" frame and the next frame with a marker bit set to "1" is found. This is the starting frame of next PPP data packet.

As has been described, the present invention provides a method and system for discarding radio link protocol frames within a CDMA mobile telephone communication network. It is important to note that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for limiting data packet transmission within a mobile telephone communication network, wherein said mobile telephone communication network includes a mobile telephone, a base station, a mobile switching center, and a network interworking function, wherein said data packet transmission includes a plurality of radio link protocol frames formed by dividing a point-to-point data packet, said method comprising the steps of:

in response to an unsuccessful transmission of one of said radio link protocol frames, performing a predetermined number of re-transmission attempts; and after said predetermined number of re-transmission attempts are considered unsuccessful, discarding all of said radio link protocol frames subsequent to said unsuccessful transmitted radio link protocol frame within said point-to-point data packet.

2. The method according to claim 1, wherein said method further includes the steps of:

providing a marker bit for each of said radio link protocol frames; and setting a marker bit of a first one of said radio link protocol frames to a first logical state and a remainder of said radio link protocol frames to a second logical state.

3. The method according to claim 2, wherein said discarding step further includes a step of discarding all of said radio link protocol frames within said point-to-point data packet having said marker bit set to said second logical state after a predetermined number of unsuccessful re-transmission attempts.

4. The method according to claim 1, wherein said discarding step is initiated from a sender.

5. The method according to claim 1, wherein said method further includes a step of re-transmitting said point-to-point data packet.

6. A mobile telephone communication system capable of discarding frames for radio link layer, said mobile telephone communication system includes a base station, a mobile switching center, and a network Interworking Function, said mobile telephone communication system comprising:

means for performing a predetermined number of re-transmission attempts, in response to an unsuccessful transmission of one of a plurality of radio link protocol frames; and means for discarding all of said radio link protocol frames subsequent to said unsuccessful transmitted radio link protocol frame within a point-to-point data packet, after said predetermined number of re-transmission attempts are considered unsuccessful.

7. The mobile telephone communication system according to claim 6, wherein said system further includes:

means for providing a marker bit for each of said radio link protocol frames; and means for setting a marker bit of a first one of said radio link protocol frames to a first logical state and a remainder of said radio link protocol frames to a second logical state.

8. The mobile telephone communication system according to claim 7, wherein said discarding means further includes a means for discarding all of said radio link protocol frames within said point-to-point data packet having said marker bit set to said second logical state after a predetermined number of unsuccessful re-transmission attempts.

9. The mobile telephone communication system according to claim 6, wherein said discarding means is located at a sender.

10. The mobile telephone communication system according to claim 6, wherein said system further includes a means for re-transmitting said point-to-point data packet.

11. A mobile telephone capable limiting data packet transmission wit a mobile telephone communication network, said mobile telephone comprising:

means for performing a predetermined number of re-transmission attempts, in response to an unsuccessful transmission of one of a plurality of radio link protocol frames; and means for discarding all of said radio link protocol frames subsequent to said unsuccessful transmitted radio link protocol frame within a point-to-point data packet, after said predetermined number of re-transmission attempts are considered unsuccessful.

12. The mobile telephone according to claim 11, wherein said mobile phone further includes:

means for providing a marker bit for each of said radio link protocol frames; and means for setting a marker bit of a first one of said radio link protocol frames to a first logical state and a remainder of said radio link protocol frames to a second logical state.

13. The mobile telephone according to claim 12, wherein said discarding means further includes a means for discarding all of said radio link protocol frames within said point-to-point data packet having said marker bit set to said second logical state after a predetermined number of unsuccessful re-transmission attempts.

14. The mobile telephone according to claim 11, wherein said system further includes a means for re-transmitting said point-to-point data packet.

* * * * *

UNITED STATES PATENT AND TRADEMARK OFFICE
CERTIFICATE OF CORRECTION

PATENT NO. : 6,556,556 B1  
DATED : April 29, 2003  
INVENTOR(S) : Sen et al.

It is certified that error appears in the above-identified patent and that said Letters Patent is hereby corrected as shown below:

Column 4,  
Line 14, delete "11".

Column 8,  
Line 5, delete "wit" and replace with "within".

Signed and Sealed this

Twenty-fifth Day of November, 2003

JAMES E. ROGAN  
*Director of the United States Patent and Trademark Office*